US008437927B2

(12) United States Patent
Brennan et al.

(10) Patent No.: US 8,437,927 B2
(45) Date of Patent: May 7, 2013

(54) SYSTEM AND METHOD FOR DETERMINING ENGINE FRICTION

(75) Inventors: Daniel G. Brennan, Brighton, MI (US); Robert Douglas Shafto, New Hudson, MI (US)

(73) Assignee: GM Global Technology Operations LLC

( * ) Notice: Subject to any disclaimer, the term of this patent is extended or adjusted under 35 U.S.C. 154(b) by 918 days.

(21) Appl. No.: 12/551,875

(22) Filed: Sep. 1, 2009

(65) Prior Publication Data

US 2011/0054744 A1 Mar. 3, 2011

(51) Int. Cl.
*G06F 19/00* (2011.01)
*F02D 41/30* (2006.01)

(52) U.S. Cl.
USPC ............ 701/51; 701/103; 701/84; 180/65.21; 73/114.25; 73/430

(58) Field of Classification Search .................... 701/84; 73/114.25, 430, 406.22
See application file for complete search history.

(56) References Cited

U.S. PATENT DOCUMENTS

| | | | | |
|---|---|---|---|---|
| 4,922,869 | A * | 5/1990 | Kadomukai et al. | 123/192.1 |
| 6,188,951 | B1 * | 2/2001 | Beechie et al. | 701/102 |
| 6,584,391 | B2 * | 6/2003 | Lack | 701/51 |
| 6,874,360 | B1 * | 4/2005 | Kar et al. | 73/115.01 |
| 6,988,974 | B2 * | 1/2006 | Kobayashi et al. | 477/3 |
| 7,040,284 | B2 * | 5/2006 | Demura et al. | 123/339.11 |
| 7,054,738 | B1 * | 5/2006 | Stotsky | 701/115 |
| 7,275,518 | B1 * | 10/2007 | Gartner et al. | 123/406.23 |
| 7,324,888 | B1 * | 1/2008 | Stotsky | 701/101 |
| 7,958,779 | B2 * | 6/2011 | Nagano et al. | 73/114.25 |
| 2009/0229897 | A1 * | 9/2009 | Yutani et al. | 180/65.28 |

FOREIGN PATENT DOCUMENTS

JP 09088786 A * 3/1997

* cited by examiner

*Primary Examiner* — Thomas Black
*Assistant Examiner* — Sara Lewandroski

(57) ABSTRACT

An engine control system includes a combustion torque determination module, a friction torque determination module, and a control module. The combustion torque determination module determines a combustion torque of an engine based on pressure inside a cylinder of the engine during an engine cycle. The friction torque determination module determines friction torque of the engine based on the combustion torque, acceleration of an engine crankshaft, effective inertia of the engine crankshaft, and a pumping loss in the cylinder during the engine cycle. The control module adjusts an operating parameter of the engine based on the friction torque.

18 Claims, 4 Drawing Sheets

SYSTEM AND METHOD FOR DETERMINING ENGINE FRICTION

FIELD

The present disclosure relates to internal combustion engines and more particularly to a system and method for determining engine friction.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An operating cycle of an internal combustion engine may include a plurality of engine strokes. For example, an operating cycle may include four different engine strokes. In an "intake stroke," the engine may draw air into a cylinder through an intake manifold and one or more intake valves. The air may be mixed with fuel in the intake manifold (i.e. port fuel injection) or in the cylinder (i.e. direct fuel injection) to form an air/fuel (A/F) mixture. In a "compression stroke," the A/F mixture may be compressed by a piston within the cylinder.

In a "power stroke," the compressed A/F mixture may be combusted by a spark plug within the cylinder to drive the piston, rotatably turning a crankshaft to generate engine power. In an "exhaust stroke," exhaust gas produced by the combustion of the A/F mixture (i.e. during the power stroke) may be expelled from the cylinder through an exhaust valve and an exhaust manifold.

The operating cycle may also be divided into an "expansion cycle" and a "non-expansion engine cycle." More specifically, the non-expansion cycle may include the intake stroke and the exhaust stroke (i.e. the pumping strokes) and a first portion of the compression stroke. Alternatively, the expansion cycle may include a remaining portion of the compression stroke and the combustion stroke. In other words, the non-expansion cycle may include the engine strokes (or portions thereof) where negative work occurs (i.e. where heat is not released by combustion).

The combustion of the A/F mixture in the cylinder drives the piston, which applies a force on an engine crankshaft. The force on the engine crankshaft may be referred to as "combustion torque." However, an amount of "drive torque" or "output torque" actually produced by the engine may be less than the combustion torque. More specifically, the drive torque may be less than combustion torque due to the energy losses (i.e. pumping losses) during the non-expansion engine cycle, engine friction, and/or additional loads on the engine from accessory devices (e.g. pumps, air conditioner, radio, etc.).

SUMMARY

An engine control system includes a combustion torque determination module, a friction torque determination module, and a control module. The combustion torque determination module determines a combustion torque of an engine based on pressure inside a cylinder of the engine during an engine cycle. The friction torque determination module determines friction torque of the engine based on the combustion torque, acceleration of an engine crankshaft, effective inertia of the engine crankshaft, and a pumping loss in the cylinder during the engine cycle. The control module adjusts an operating parameter of the engine based on the friction torque.

A method includes determining a combustion torque of an engine based on pressure inside a cylinder of the engine during an engine cycle, determining a friction torque of the engine based on the combustion torque, acceleration of an engine crankshaft, effective inertia of the engine crankshaft, and a pumping loss in the cylinder during the engine cycle, and adjusting an operating parameter of the engine based on the friction torque.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
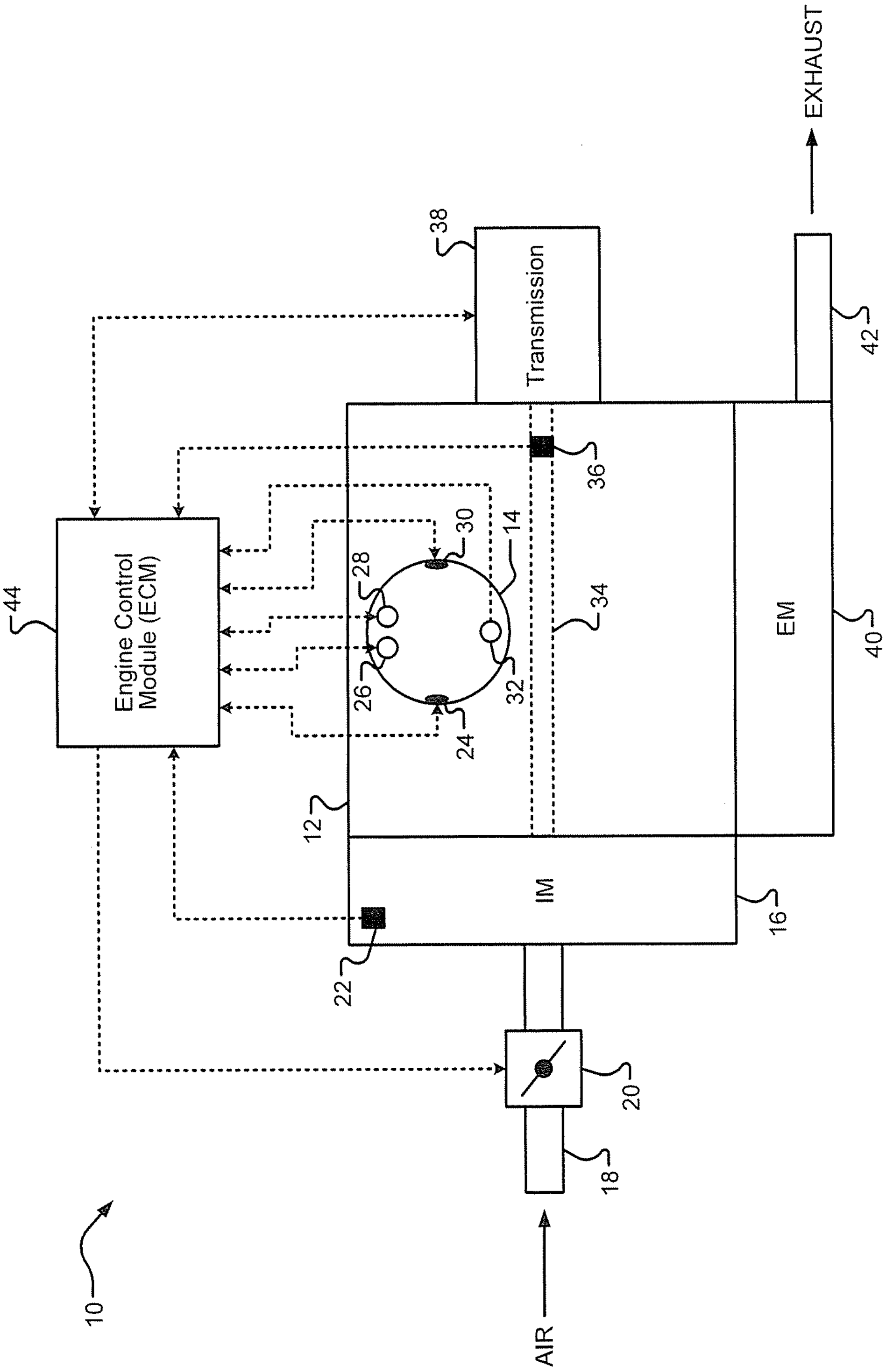
FIG. 1 is a functional block diagram of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Drive torque output by an engine may be less than combustion torque actually generated by the engine. The difference between combustion torque and drive torque may be referred to as "friction torque." In other words, friction torque may represent an amount of torque lost during an engine cycle. For example, friction torque may include energy losses (i.e. pumping losses) during a non-expansion engine cycle, engine friction, and/or additional loads on the engine from accessory devices.

For example, friction torque may be used to control deceleration (i.e. coastdown) of a vehicle. Alternatively, for example, friction torque may be used to control active braking (i.e. downshifting) in a hybrid vehicle. However, conventional engine control systems determine friction torque based on predetermined calibration data. In other words, conventional engine control systems may not determine friction torque of an engine in real-time.

Therefore, systems and methods are presented that determine friction torque of an engine in real-time. More specifically, the systems and methods presented may determine combustion torque in real-time using a pressure sensor in a cylinder. Thus, the systems and methods presented may then determine the friction torque based on the combustion torque, drive torque output by the engine, and pumping losses during a cycle of the engine. For example, the drive torque may be determined based on a rate of change of a crankshaft of the engine and a predetermined inertia of the crankshaft. Additionally, for example, the pumping losses during a cycle of the engine may be determined using a model based on cylinder pressure and crankshaft position.

Therefore, the systems and methods presented may be used to accurately determine the friction torque by subtracting the drive torque and the pumping losses from the combustion torque. Thus, the friction torque may be determined in real-time, and may compensate for changes in a plurality of loads on the engine from accessory devices (e.g. pumps, air conditioner, radio, etc.) The systems and methods presented may then adjust an operating parameter of the engine based on the friction torque to control one of vehicle coastdown performance and active braking (for a hybrid vehicle). For example only, the operating parameter may be a throttle position, an amount of fuel injection, and/or a gear ratio of a transmission.

Referring now to FIG. 1, an engine system 10 that includes an engine 12 is shown. It can be appreciated that the engine system 10 may be a hybrid engine system that further includes an electric motor (not shown). The engine 12 includes an exemplary cylinder 14. It may be appreciated that while one exemplary cylinder 14 is shown, the engine 12 may include other numbers of cylinders.

Air is drawn into the engine 12 and into an intake manifold 16 through an air intake 18 that is regulated by a throttle 20. An intake MAP sensor 22 measures pressure inside the intake manifold 16. The air drawn into the engine 12 is distributed to the cylinder 14 through an intake valve 24 and combined with fuel from a fuel tank (not shown). For example, the fuel may be injected into the cylinder 14 by a fuel injector 26. While the cylinder 14 is shown to include the fuel injector 26 (i.e. direct fuel injection), it can be appreciated that the fuel injector 26 may also be located in the intake manifold 16 or in an intake port (not shown) prior to the intake valve 24 (i.e. port fuel injection). In one embodiment, the cylinder 14 may also include a pressure sensor 32 that measures pressure inside the cylinder 14.

The air/fuel (A/F) mixture in the cylinder 14 is compressed by a piston (not shown) and combusted by a spark plug 28. The combustion of the A/F mixture drives a piston (not shown), which rotatably turns a crankshaft 34 to produce drive torque. A crankshaft sensor 36 may measure a rotational position and/or speed (RPM) of the crankshaft 34. A transmission 38 may translate torque on the crankshaft 34 to a vehicle driveline (i.e. wheels). Exhaust gases may be expelled from the cylinder 14 through an exhaust valve 30, an exhaust manifold 40, and an exhaust system 42.

An engine control module (ECM) 44 regulates operation of the engine 12. For example, the ECM 44 may control the throttle 20, the intake valve 24, the exhaust valve 30, and/or the fuel injector 26 to control the A/F ratio in the engine 12. Additionally, for example, the ECM 44 may control the spark plug 28 to control the ignition timing of the engine 12. The ECM 44 also receives signals from the MAP sensor 22, and the crankshaft sensor 36.

Figure 2:
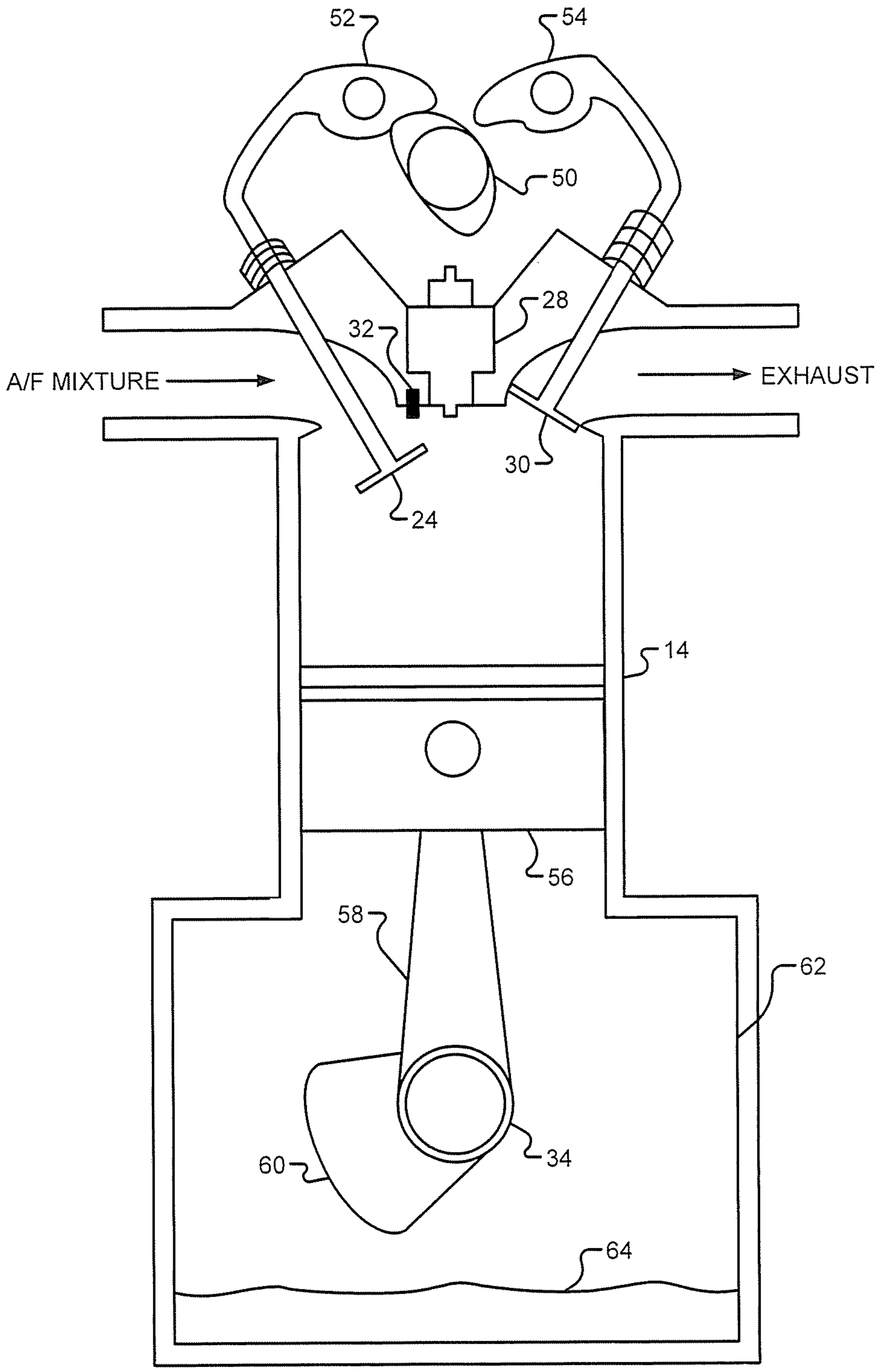
FIG. 2 is a cross-sectional view of an exemplary cylinder according to the present disclosure.

Referring now to FIG. 2, a cross-sectional view of the exemplary cylinder 14 is shown. The cylinder 14 includes the intake valve 24, the spark plug 28, the exhaust valve 30, and the cylinder pressure sensor 32. While the cylinder 14 is not shown to include the fuel injector 26 (i.e. port fuel injection), it can be appreciated that the fuel injector 26 may be in the cylinder 14 (i.e. direct fuel injection).

Above the cylinder 14 is a camshaft 50, an intake rocker arm 52, and an exhaust rocker arm 54. While a single camshaft 50 is shown, it can be appreciated that multiple camshafts 50 may be implemented (e.g. dual overhead camshafts). The intake rocker arm 52 is connected to and thus controls movement of the intake valve 24. Similarly, the exhaust rocker arm 54 is connected to and thus controls the movement of the exhaust valve 30. The camshaft 50 includes irregular lobes that actuate one of the rocker arms 52, 54 to open a corresponding valve 24, 30, respectively. Furthermore, when one of the rocker arms 52, 54 and the corresponding valve 24, 30 is actuated, a spring on the other one of the rocker arms 52, 54 closes the corresponding valve 24, 30. In other words, for example, only one of the valves 24, 30 may be open at a particular time. As shown in FIG. 2B, for example, the camshaft 50 is actuating the intake rocker arm 52 and the intake valve 24 while the exhaust valve 30 remains closed. While springs are illustrated to return the valves 24, 30 to closed positions, it can be appreciated that other systems and methods may be used to return the valves 24, 30 to an open or closed position. For example only, an electro-hydraulic system may be implemented that uses hydraulic pressure to open and/or close the valves 24, 30.

The cylinder 14 further includes a piston 56. For example, friction torque may correspond to friction between the piston 56 and the wall of the cylinder 14. The piston 56 is attached to the crankshaft 34 via a connecting rod 58. The crankshaft 34 is also attached a counterweight 60. The crankshaft 34, the counterweight 60, and a portion of the connecting rod 58 reside in a crankcase 62. The crankcase 62 may further include a lubricant sump 64 (e.g. oil) that is used for lubricating moving parts. A volume of the cylinder 14 may refer to a space above the piston 56 (i.e. when both the intake/exhaust valves 24, 30 are closed).

Figure 3:
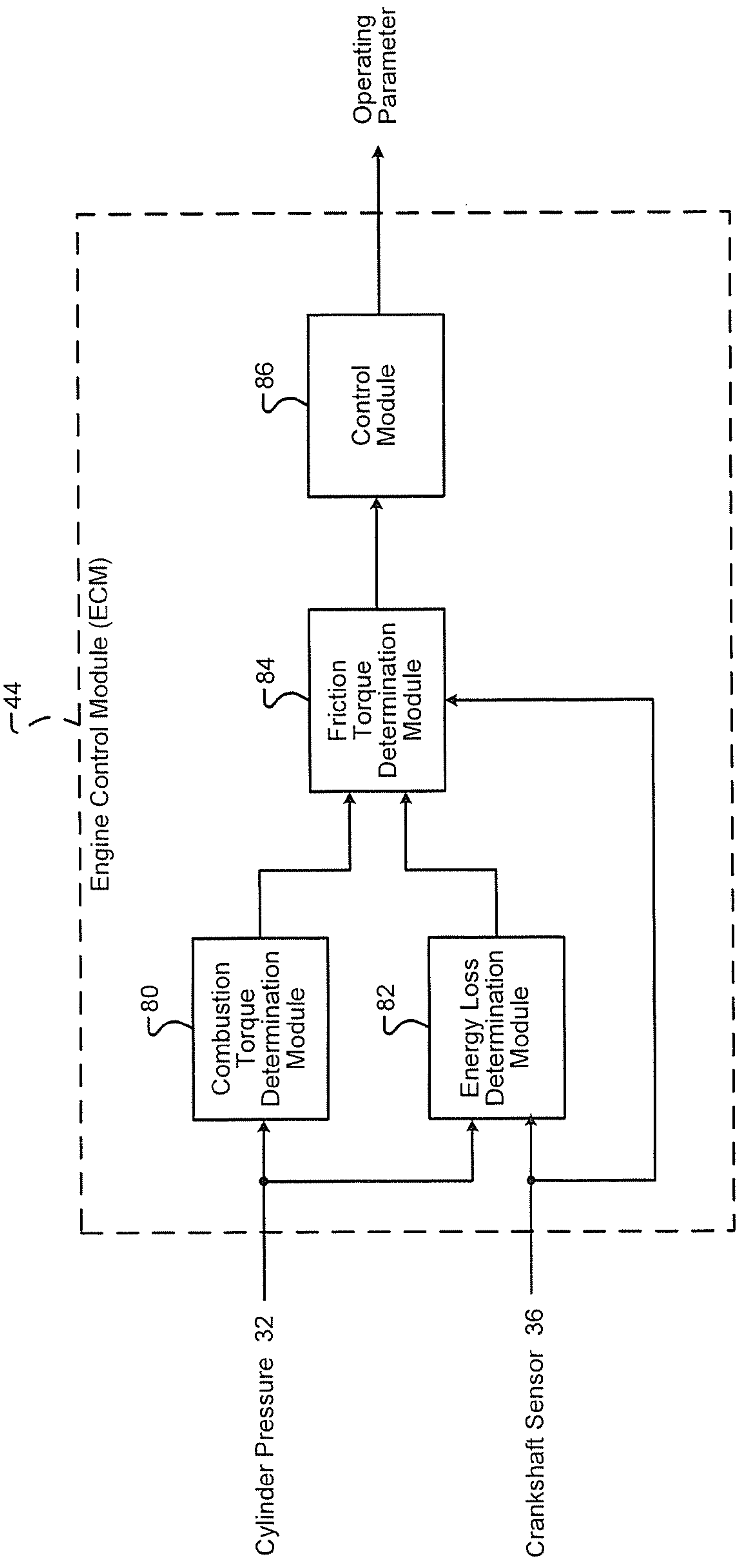
FIG. 3 is a functional block diagram of an exemplary engine control module according to the present disclosure.

Referring now to FIG. 3, the ECM 44 may include a combustion torque determination module 80, a energy loss determination module 82, a friction torque determination module 84, and a control module 86.

The combustion torque determination module 80 receives a cylinder pressure from the cylinder pressure sensor 36. The combustion torque determination module 80 may determine combustion torque in real-time based on the cylinder pressure. More specifically, the combustion torque determination module 80 may determine an indicated mean effective pressure (IMEP) in a cylinder 14. The IMEP corresponds to an average force applied to the piston 56 during an engine cycle. Therefore, the IMEP may directly relate to the combustion torque on the crankshaft 34, corresponding to the cylinder 14.

The energy loss determination module 82 receives the cylinder pressure signal from the cylinder pressure sensor 32 and the crankshaft signal from the crankshaft sensor 36. The energy loss determination module 82 may determine an energy loss (i.e. pumping loss) during a cycle of the engine 12 based on a difference between an expected pressure and an actual pressure. More specifically, the expected pressure may be one of a plurality of predetermined pressures corresponding to various crankshaft positions, and the actual pressure may be the cylinder pressure signal.

The friction torque determination module 84 receives the combustion torque from the combustion torque determination module 80 and the energy loss from the energy loss determination module 82. The friction torque determination module 84 may determine friction torque based on the combustion torque, the energy loss, crankshaft acceleration, and effective crankshaft inertia. More specifically, the crankshaft acceleration may be determined by monitoring the crankshaft signal from the crankshaft sensor 36 for a predetermined period of time.

The effective crankshaft inertia may correspond to predetermined calibration data. For example only, the effective crankshaft inertia may be measured using a dynamometer and stored in a look-up table. The crankshaft acceleration and the effective engine inertia may be used to determine "inertial torque." Inertial torque may correspond to energy used to accelerate (i.e. spin) the crankshaft 34, which is then stored in the accelerated crankshaft 34. Therefore, the friction torque may be determined by subtracting inertial torque and energy loss from the combustion torque.

The control module 86 receives the friction torque from the friction torque determination module 84. The control module 86 adjusts an operating parameter of the engine 12 based on the friction torque to control one of vehicle coastdown control performance and active braking (in a hybrid vehicle). More specifically, for example, the operating parameter may include throttle position, an amount of fuel injection, and/or a gear ratio of the transmission 38. For example only, the control module 86 may increase throttle (i.e. airflow), increase fuel supplied to the engine 12, and downshift the transmission 38 into a lower gear.

Figure 4:
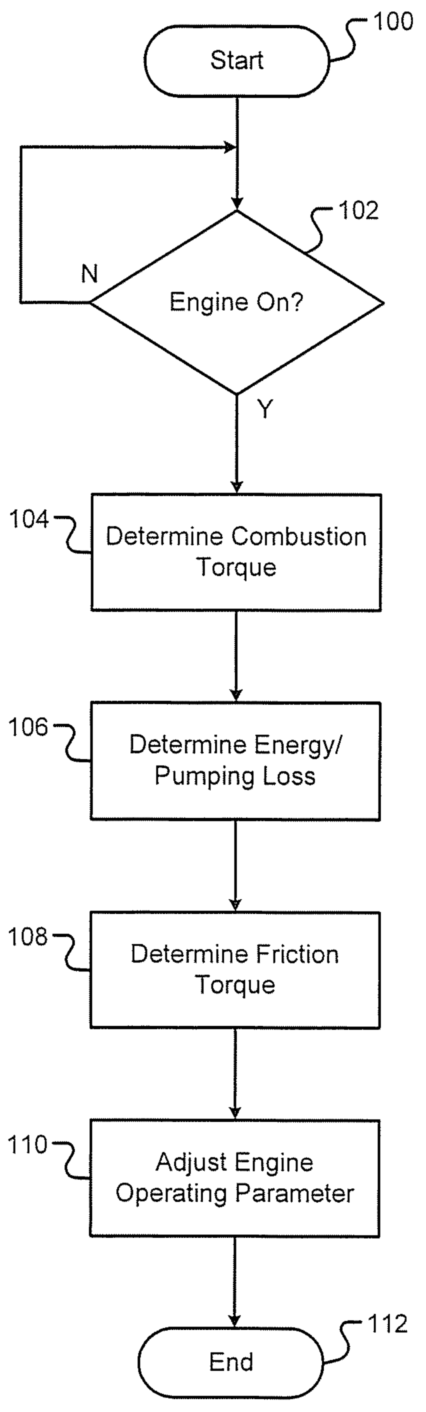
FIG. 4 is a flow diagram of a method for determining engine friction according to the present disclosure.

Referring now to FIG. 4, a method for determining engine friction begins in step 100. In step 102, the ECM 44 may determine whether the engine 12 is operating. If true, control may proceed to step 104. If false, control may return to step 102.

In step 104, the ECM 44 may determine combustion torque of the engine 12 based on cylinder pressure from the cylinder pressure sensor 32 during an engine cycle. In step 106, the ECM 44 may determine an energy loss (i.e. pumping loss) in the cylinder 1 during the engine cycle.

In step 108, the ECM 44 may determine friction torque of the engine 12 based on the combustion torque, the pumping loss of the cylinder, acceleration of the crankshaft 34, and predetermined engine inertia data. In step 110, the ECM 44 may adjust an operating parameter of the engine 12 to control one of vehicle coastdown performance and active braking (in a hybrid vehicle). Control may then end in step 112.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:

a combustion torque determination module that determines a combustion torque of an engine based on pressure inside a cylinder of the engine during an engine cycle;

a friction torque determination module that determines friction torque of the engine based on the combustion torque, acceleration of an engine crankshaft, effective inertia of the engine crankshaft, and a pumping loss in the cylinder during the engine cycle;

an energy loss determination module that determines the pumping loss in the cylinder during the engine cycle based on pressure inside the cylinder and an expected pressure inside the cylinder, wherein the expected pressure is based on a position of the engine crankshaft; and a control module that adjusts an operating parameter of the engine based on the friction torque.

2. The engine control system of claim 1, wherein the operating parameter is one of a throttle position, an amount of fuel injection, and a gear ratio of a transmission.

3. The engine control system of claim 1, wherein the friction torque determination module determines the friction torque by subtracting an inertial torque and the pumping loss from the combustion torque, wherein the inertial torque is based on the acceleration of the engine crankshaft and the effective inertia of the engine crankshaft.

4. The engine control system of claim 1, wherein the effective inertia of the engine crankshaft is based on predetermined calibration data generated using a dynamometer.

5. The engine control system of claim 1, wherein the friction torque is based on at least one of friction between a piston in the cylinder and a wall of the cylinder, and loads on the engine from accessory devices.

6. The engine control system of claim 1, wherein the control module adjusts the operating parameter to control deceleration of a vehicle.

7. The engine control system of claim 1, wherein the control module adjusts the operating parameter to control active braking of a hybrid vehicle.

8. The engine control system of claim 1, further comprising:

a crankshaft sensor that measures a position of the engine crankshaft.

9. The engine control system of claim 8, wherein the acceleration of the engine crankshaft is based on a change in the position of the engine crankshaft during a predetermined period of time.

10. A method, comprising:

determining a combustion torque of an engine based on pressure inside a cylinder of the engine during an engine cycle;

determining a friction torque of the engine based on the combustion torque, acceleration of an engine crankshaft, effective inertia of the engine crankshaft, and a pumping loss in the cylinder during the engine cycle;

determining the pumping loss in the cylinder during the engine cycle based on pressure inside the cylinder and an expected pressure inside the cylinder, wherein the expected pressure is based on a position of the engine crankshaft; and adjusting an operating parameter of the engine based on the friction torque.

11. The method of claim 10, wherein the effective inertia of the engine crankshaft is based on predetermined calibration data generated using a dynamometer.

12. The method of claim 10, wherein the operating parameter is one of a throttle position, an amount of fuel injection, and a gear ratio of a transmission.

13. The method of claim 10, wherein determining the friction torque includes subtracting an inertial torque and the pumping loss from the combustion torque, wherein the inertial torque is based on the acceleration of the engine crankshaft and the effective inertia of the engine crankshaft.

14. The method of claim 10, wherein the operating parameter is adjusted to control active braking of a hybrid vehicle.

15. The method of claim 10, wherein the friction torque is based on at least one of friction between a piston in the cylinder and a wall of the cylinder, and loads on the engine from accessory devices.

16. The method of claim 10, wherein the operating parameter is adjusted to control deceleration of a vehicle.

17. The method of claim 10, further comprising:

measuring a position of the engine crankshaft using a crankshaft sensor.

18. The method of claim 17, wherein the acceleration of the engine crankshaft is based on a change in the position of the engine crankshaft during a predetermined period of time.

* * * * *